(12) United States Patent  
Speelman, Jr.

(10) Patent No.: US 7,815,009 B1  
(45) Date of Patent: Oct. 19, 2010

(54) GOLF CART ACTUATING SYSTEM

(76) Inventor: Robert E. Speelman, Jr., 2652 Water Level Rd., Somerset, PA (US) 15501

( * ) Notice: Subject to any disclaimer, the term of this patent is extended or adjusted under 35 U.S.C. 154(b) by 900 days.

(21) Appl. No.: 11/681,256

(22) Filed: Mar. 2, 2007

(51) Int. Cl.
    *B60K 20/04* (2006.01)
(52) U.S. Cl. ............... 180/336; 180/332; 180/315; 74/473.1; 74/473.33
(58) Field of Classification Search ............... 180/336, 180/335, 332, 315; 74/20, 25, 27, 473.1, 74/473.3, 473.33, 491, 469
    See application file for complete search history.

(56) References Cited

U.S. PATENT DOCUMENTS

| | | | |
|---|---|---|---|
| 927,698 | A | 7/1909 | Warner |
| 1,469,579 | A | 10/1923 | Borden |
| 2,969,695 | A | 1/1961 | Christenson et al. |
| 2,975,651 | A | 3/1961 | Fox et al. |
| 4,507,980 | A | 4/1985 | Nishiyama et al. |
| 5,094,326 | A * | 3/1992 | Schemelin et al. ......... 192/3.63 |
| D469,724 | S | 2/2003 | Ramos et al. |
| 2003/0221503 | A1 * | 12/2003 | Mita et al. ............... 74/473.15 |
| 2005/0028631 | A1 * | 2/2005 | Watkins ..................... 74/473.1 |

FOREIGN PATENT DOCUMENTS

JP          55-156722 A    * 12/1980

* cited by examiner

*Primary Examiner*—Ruth Ilan

(57) ABSTRACT

A golf cart actuating system includes a golf cart that includes a seat assembly vertically spaced from a foot rest wall. A support wall extends between the foot rest wall and the seat portion. A direction rod extends through the support wall. The direction rod is rotated to a first position to select forward movement and rotated to a second position to select rearward movement. A bracket is attached to the foot rest wall. A pivot member is pivotably coupled to the bracket. A crank is attached to the direction rod. A lifting post is attached to and extends between the crank and the pivot member. A control post is attached to and extends upwardly from the pivot member. Movement of the control post away from or toward the seat assembly alternates the direction rod from the first position to the second position.

6 Claims, 4 Drawing Sheets

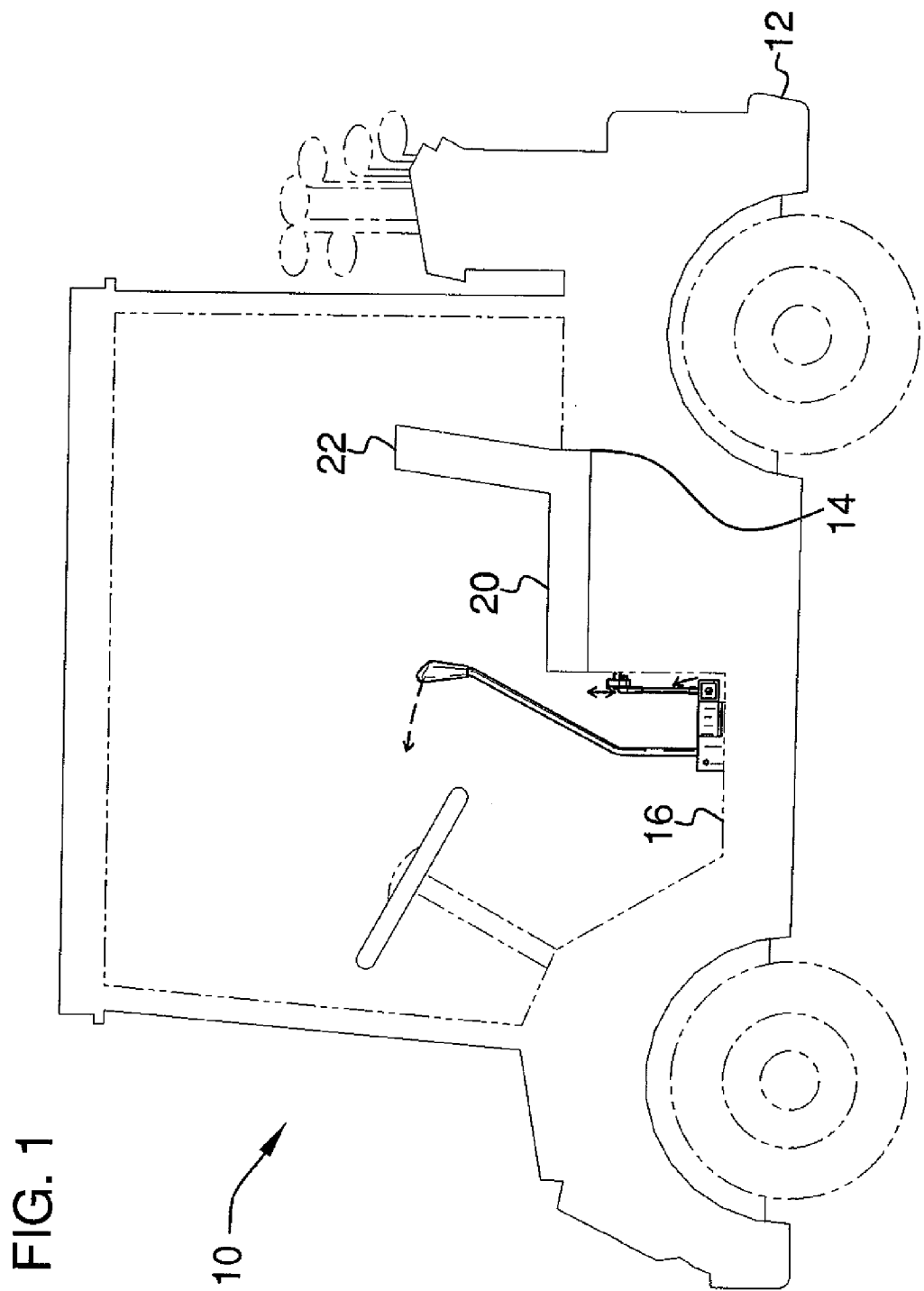

GOLF CART ACTUATING SYSTEM

BACKGROUND OF THE INVENTION

1. Field of the Invention

The present invention relates to golf cart control devices and more particularly pertains to a new golf cart control device for actuating the reverse and forward drive mechanism of a golf cart.

2. Description of the Prior Art

The use of golf cart control devices is known in the prior art. While these devices fulfill their respective, particular objectives and requirements, the need remains for a system that can be attached to a golf cart to more easily actuate its transmission mechanism. Typically, golf carts include either a switch on the dash of the golf cart or a handle positioned below the seat which is rotated. Each of these devices is difficult to reach, and, in the case of the handle, often difficult to find. For that reason, the system includes a structure for replacing these handles allowing actuation while a driver of the golf cart comfortably sits in an upright position.

SUMMARY OF THE INVENTION

The present invention meets the needs presented above by generally comprising a golf cart that includes a seat assembly which is vertically spaced from a foot rest wall. The seat assembly includes a seat portion and a backrest portion. A support wall extends between the foot rest wall and the seat portion. A direction rod extends through the support wall. The direction rod is rotated to a first position to select forward movement of the golf cart and rotated to a second position to select rearward movement of the golf cart. A bracket is attached to the foot rest wall. A pivot member is pivotably coupled to the bracket. A crank is attached to the direction rod and has a distal end with respect to the direction rod. A lifting post is attached to and extends between the distal end of the crank and the pivot member. A control post is attached to and extends upwardly from the pivot member. Movement of the control post away from or toward the seat assembly alternates the direction rod from the first position to the second position. The control post has a bottom end and an upper end. The bottom end is attached to the pivot member adjacent to the first end of the pivot member and the upper end is positioned above a plane of the seat portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a golf cart actuating system according to the present invention.

DESCRIPTION OF THE PREFERRED EMBODIMENT

Figure 3:
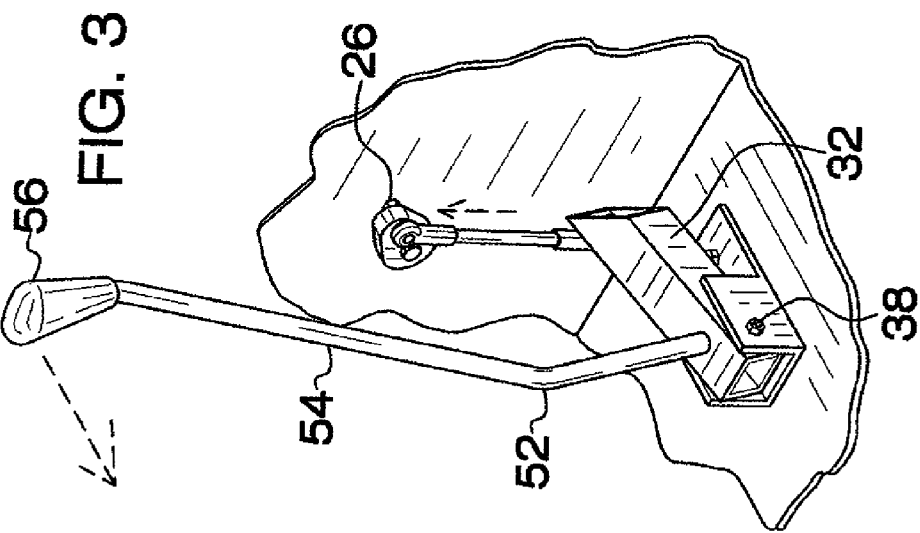
FIG. 3 is a perspective right side view of the present invention.

With reference now to the drawings, and in particular to FIGS. 1 through 5 thereof, a new golf cart control device embodying the principles and concepts of the present invention and generally designated by the reference numeral 10 will be described.

As best illustrated in FIGS. 1 through 5, the golf cart actuating system 10 generally comprises a golf cart 12 that includes a seat assembly 14 that is vertically spaced from a foot rest wall 16. The seat assembly 14 includes a seat portion 20 and a backrest portion 22. A support wall 24 extends between the foot rest wall 16 and the seat portion 20. A direction rod 26 extends through the support wall 24. The direction rod 26 is coupled a transmission mechanism and motor of the golf cart 12 and is rotated to a first position to select forward movement of the golf cart 12 and rotated to a second position to select rearward movement of the golf cart 12.

A bracket 28 is attached to the foot rest wall 16. The bracket 28 includes a pair of lateral walls 30 that are spaced from each other. The lateral walls 30 are orientated parallel to each other and are orientated perpendicular to the support wall 24.

A pivot member 32 is pivotably coupled to the bracket 28. The pivot member 32 is positioned between the lateral walls 30. The pivot member 32 is elongated and has a first end 34 and a second end 36. A pivot rod 38 pivotably couples the pivot member 32 to the bracket 28 and extends through the lateral walls 30. The pivot rod 38 is positioned adjacent to the first end 34 of the pivot member 32.

A crank 40 is attached to the direction rod 26. The crank 40 replaces what would typically be a handle attached to the direction rod 26 to allow a person to actuate the direction rod 26. The crank 40 has a distal end 42 with respect to the direction rod 26. A lifting post 44 is pivotably attached to and extends between the distal end 42 of the crank 40 and the pivot member 32. The lifting post 44 is pivotably coupled to the pivot member 32 adjacent to the second end 36.

Figure 2:
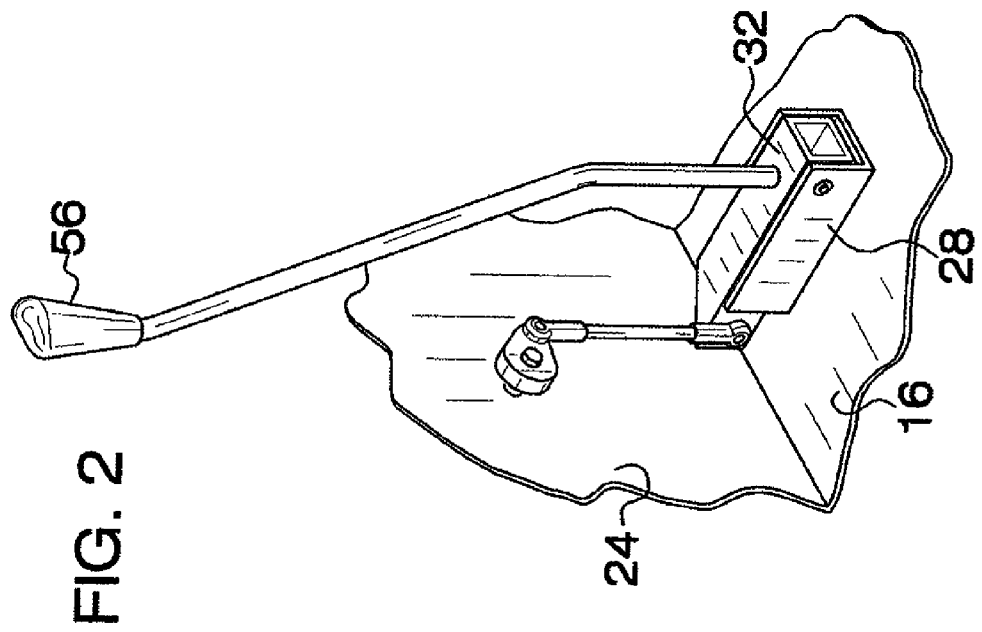
FIG. 2 is a perspective left side view of the present invention.
Figure 4:
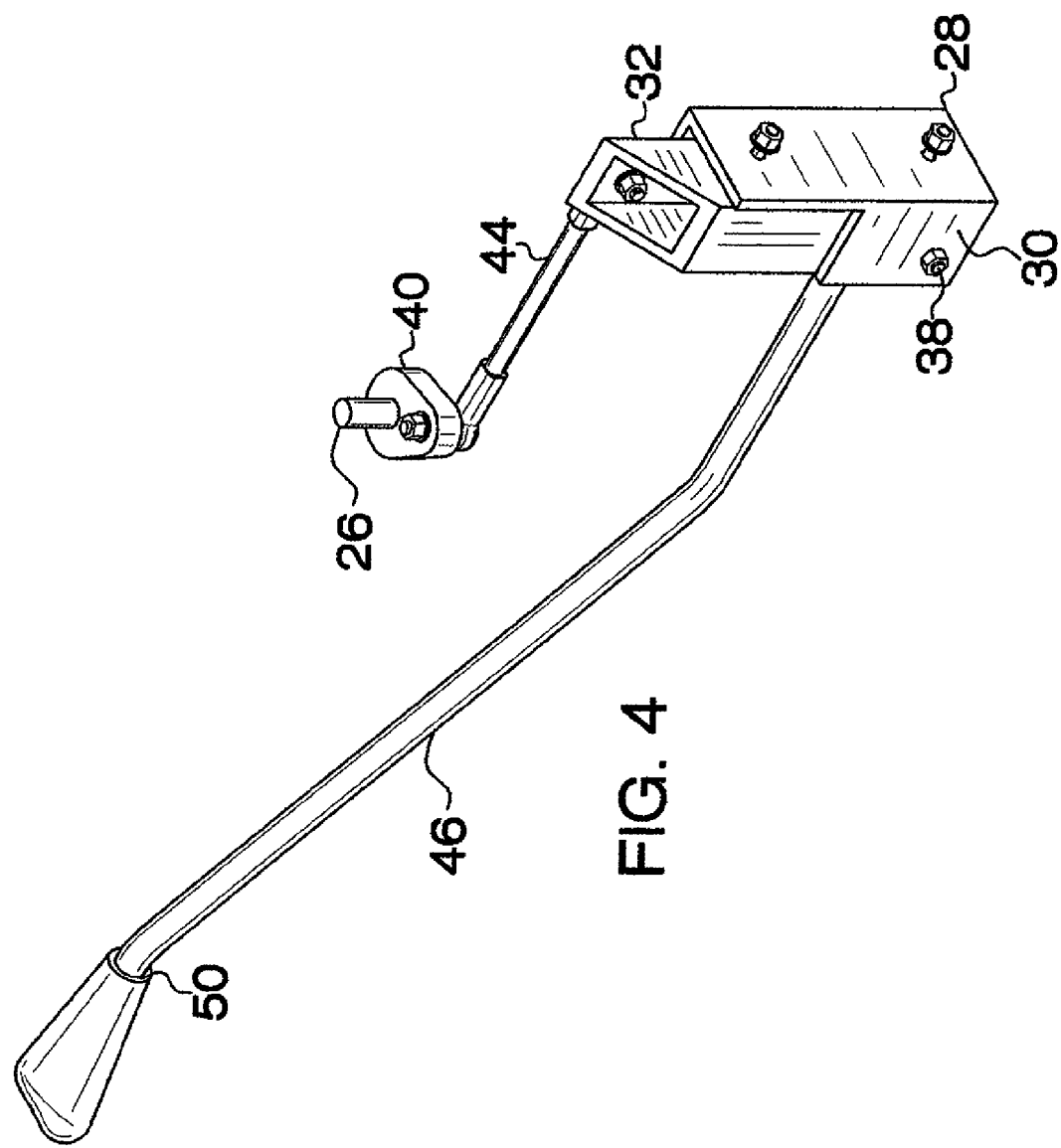
FIG. 4 is a perspective bottom view of the present invention.
Figure 5:
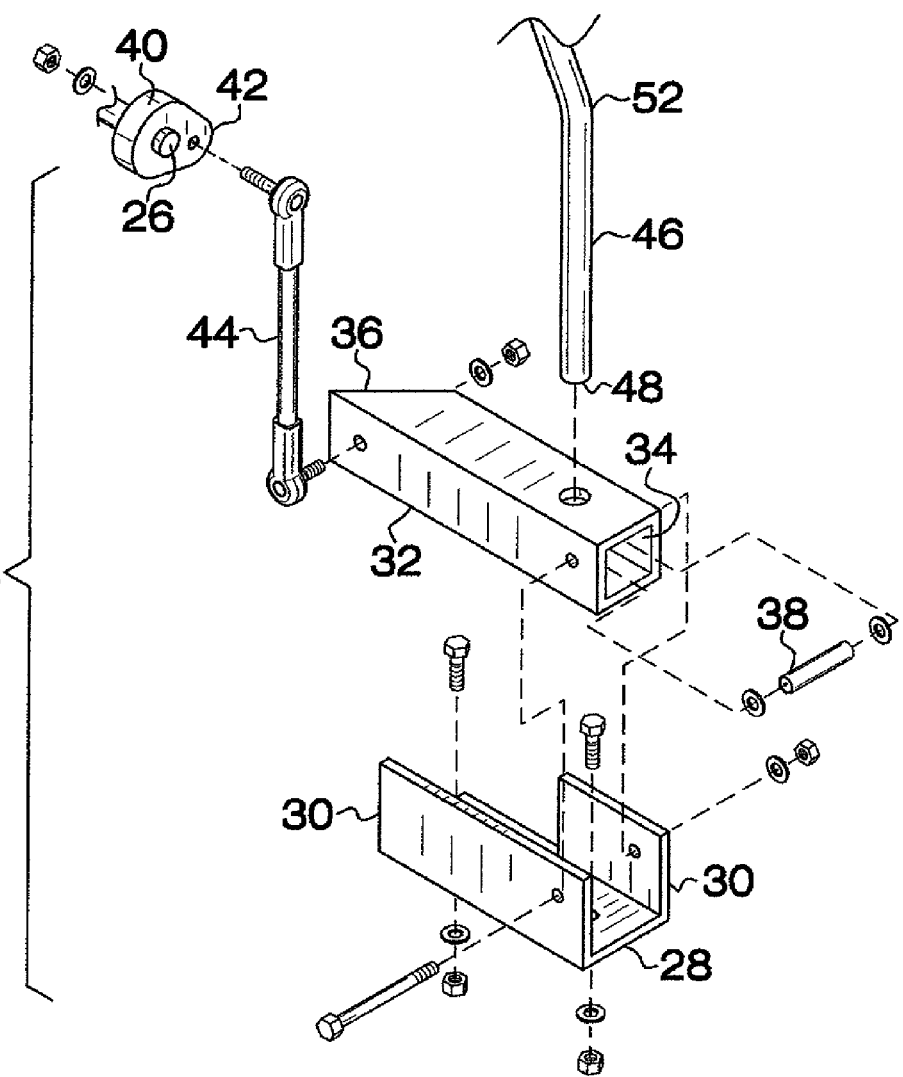
FIG. 5 is an exploded view of the present invention.

A control post 46 is attached to and extends upwardly from the pivot member 32. Movement of the control post 46 away from or toward the seat assembly 14 alternates the direction rod 26 from the first position to the second position as is shown in FIG. 3. The control post 46 has a bottom end 48 and an upper end 50. The bottom end 48 is attached to the pivot member 32 adjacent to the first end 34 of the pivot member 32. The upper end 50 is positioned above a plane of the seat portion 20. The control post 46 has a bend 52 therein positioned between the upper 50 and bottom 48 ends. An upper portion 54 of the control post 46 is defined between the bend 52 and the upper end 50. The upper portion 54 extends toward the seat assembly 14. Preferably, the second end 36 of the elongated member 32 is abutted against the bracket 28 or foot rest wall 16 when the direction rod 26 is in the first position as shown in FIG. 2. A grip 56 is attached to the upper end 50 of the control post 46. The grip 56 may be comprised of an elastomeric material.

In use, the driver of the golf cart 12 uses the control post 46 to select either reverse or forward directions of driving. The control post 46 allows for easy location and actuation of the direction rod 26 without having to bend forward to find and grip the direction rod 26.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A forward and reverse actuating system comprising:
   a golf cart including a seat assembly being vertically spaced from a foot rest wall, said seat assembly including a seat portion and a backrest portion, a support wall extending between said foot rest wall and said seat portion, a direction rod extending through said support wall, said direction rod being rotated to a first position to select forward movement of the golf cart and rotated to a second position to select rearward movement of the golf cart;
   a bracket being attached to said foot rest wall;
   a pivot member being pivotably coupled to said bracket;
   a crank being attached to said direction rod, said crank having a distal end with respect to said direction rod;
   a lifting post being attached to and extending between said distal end of said crank and said pivot member; and
   a control post being attached to and extending upwardly from said pivot member, wherein movement of said control post away from or toward said seat assembly alternates said direction rod from said first position to said second position, said control post having a bottom end and an upper end, said bottom end being attached to said pivot member adjacent to said first end of said pivot member, said upper end being positioned above a plane of said seat portion.

2. The system according to claim 1, wherein said bracket includes a pair of lateral walls being spaced from each other, said lateral walls being orientated parallel to each other and being orientated perpendicular to said support wall, said pivot member being positioned between said lateral walls.

3. The system according to claim 2, wherein said pivot member is elongated and has a first end and a second end, a pivot rod pivotably coupling said pivot member to said bracket, said pivot rod being positioned adjacent to said first end of said pivot member, said lifting post being pivotably coupled to said pivot member adjacent to said second end, said bottom end of said control post is positioned adjacent to said first end of said pivot member.

4. The system according to claim 1, wherein said control post has a bend therein positioned between said upper and bottom ends, an upper portion of said control post being defined between said bend and said upper end, said upper portion extending toward said seat assembly.

5. The system according to claim 1, further including a grip being attached to said upper end of said control post.

6. A forward and reverse actuating system comprising:
   a golf cart including a seat assembly being vertically spaced from a foot rest wall, said seat assembly including a seat portion and a backrest portion, a support wall extending between said foot rest wall and said seat portion, a direction rod extending through said support wall, said direction rod being rotated to a first position to select forward movement of the golf cart and rotated to a second position to select rearward movement of the golf cart;
   a bracket being attached to said foot rest wall, said bracket including a pair of lateral walls being spaced from each other, said lateral walls being orientated parallel to each other and being orientated perpendicular to said support wall;
   a pivot member being pivotably coupled to said bracket, said pivot member being positioned between said lateral walls, said pivot member being elongated and having a first end and a second end, a pivot rod pivotably coupling said pivot member to said bracket, said pivot rod being positioned adjacent to said first end of said pivot member;
   a crank being attached to said direction rod, said crank having a distal end with respect to said direction rod;
   a lifting post being attached to and extending between said distal end of said crank and said pivot member, said lifting post being pivotably coupled to said pivot member adjacent to said second end;
   a control post being attached to and extending upwardly from said pivot member, wherein movement of said control post away from or toward said seat assembly alternates said direction rod from said first position to said second position, said control post having a bottom end and an upper end, said bottom end being attached to said pivot member adjacent to said first end of said pivot member, said upper end being positioned above a plane of said seat portion, said control post having a bend therein positioned between said upper and bottom ends, an upper portion of said control post being defined between said bend and said upper end, said upper portion extending toward said seat assembly; and
   a grip being attached to said upper end of said control post.

* * * * *